United States Patent Office 3,359,539
Patented Dec. 19, 1967

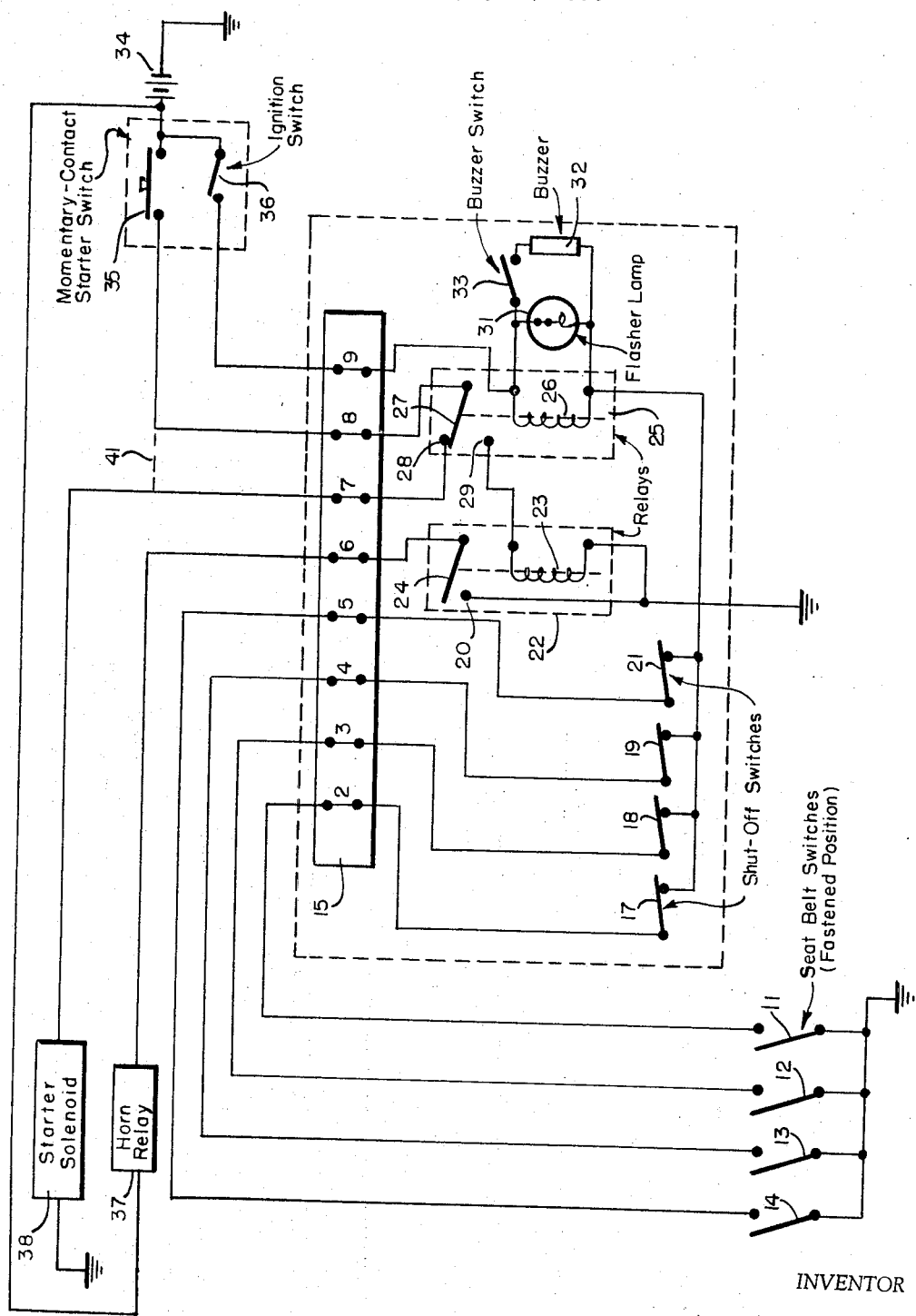

3,359,539
SEAT BELT IGNITION INTERLOCK AND ALARM
Joseph Fink, 19890 Grandview Drive,
Topanga, Calif. 90290
Filed July 29, 1964, Ser. No. 385,996
9 Claims. (Cl. 340—53)

ABSTRACT OF THE DISCLOSURE

This disclosure describes an attachment for an automobile, which attachment serves as an alarm to indicate when seat belts are not properly fastened, to prevent the starting of the automobile until the situation is corrected, and to serve as a burglar alarm. The attachment includes a buzzer and light (both optional) connected in series with the ignition switch of the automobile and in series with normally closed switches connected to the seat belts. When the seat belts are not fastened, closing the ignition circuit causes the light and buzzer to be energized. Seat belt selector switches may be placed in series in each seat belt circuit to eliminate the operation of any circuit not occupied by a seat belt wearer. In addition, the circuit from the vehicle battery to the starter solenoid is broken, and the contacts of a relay in the attachment are connected in series therewith. The relay coil is connected in the ignition circuit and is energized at the same time the light and buzzer are energized. So long as the light and buzzer, and the relay coil, are energized (this is only when the ignition is on and the seat belts are not fastened), the relay contacts are open and there is no circuit from the car battery to the starter solenoid. When the seat belts are fastened, the relay contacts close, the starter solenoid is energized, and the vehicle motor is started. A second set of contacts on the relay may be added to be closed when the solenoid contacts are opened. These additional contacts can be used to energize the vehicle horn as a burglar alarm.

---

This invention relates to safety devices and alarms, and more particularly to a device which prevents a vehicle from being started unless one or more designated seat belts is properly fastened and which indicates to the driver of the vehicle that such a condition exists. In addition, this invention relates to the use of said device as a burglar and vehicle tamper alarm and warning signal.

In recent years an increasing number of states have enacted safety legislation which requires the installation of seat belts in all new automobiles offered for sale. These acts, and the additional publicity given the use of seat belts by organizations dedicated to improving public safety, have greatly increased the number of seat belts presently installed in automobiles.

However, the installation of seat belts does not always assure their use. It is futile to install seat belts in a vehicle if the occupants do not use them.

Many devices have been devised for informing the driver of a motor vehicle or the pilot of an aircraft when the seat belts in his vehicle are not fastened. In general, the prior art devices include the seat belt, or a portion thereof, in a circuit which also includes a warning signal and a source of electrical energy so that the circuit from the source to the signal is completed when the belt is not fastened. In this way, the driver or pilot is notified of the state of the seat belts within his vehicle.

It is an object of this invention to provide a new and improved safety and warning device for use in vehicles.

It is another object of this invention to provide a new and improved device which indicates when seat belts are not properly fastened.

It is a further object of this invention to provide a new and improved safety device for preventing a vehicle from being started when the seat belts are not properly fastened, while incorporating such safety features as to prevent accidentally shutting off the engine after it is started.

Further objects and advantages of this invention will become more apparent as the following description proceeds, which description should be considered together with the single figure of the drawing which is a schematic circuit wiring diagram of the circuit of this invention.

This invention departs from the prior art type of seat belt warning system by providing an indication not only during the interval that the vehicle is being started, but also an indication if the seat belt does not remain properly fastened after the vehicle has been started. This invention also differs from the prior art devices in other respects which will become apparent as the following description proceeds.

As shown in the single figure of the drawing, a plurality of normally closed switches 11, 12, 13 and 14 are individually fastened to seat belts (not shown) in a vehicle. Although not shown in detail, the switches 11, 12, 13 and 14 are contemplated to be spring loaded switches which are opened by the force of the seat belt being properly closed and drawn up about the person in the vehicle. One side of each of the belt switches 11, 12, 13 and 14 is connected to ground. The other side of the seat belt switches 11, 12, 13 and 14 is connected to an individual one of a group of terminals 2, 3, 4, and 5 on a terminal board 15. The terminal 2 to which the belt switch 11 is connected, is connected to the movable contact of a selector switch 17. The belt switch 12 is connected through a terminal 3 to the movable contact of a selector swtch 18; the belt switch 13 is connected through a terminal 4 to the movable contact of a selector switch 19; and the belt switch 14 is connected through a terminal 5 to the movable contact of a selector switch 21. Thus, each belt switch has its own selector switch which determines whether or not the individual belt switches are operative in the circuit at any time.

The stationary contacts of the selector switches 17, 18, 19 and 21 are connected together and to one side of a relay coil 26 of a relay 25. The relay 25 also includes a movable contact 27 and two stationary contacts 28 and 29, only one of which is engaged by the movable contact 27 at any time. A buzzer 32, connected through a switch 33, and a signal lamp 31 are both connected in parallel with the coil 26. The other side of the coil 26 is connected through terminal 9 on the terminal board 15 to the side of the ignition switch 36 which is energized only when the ignition is on.

The movable contact 27 of the relay 25 is connected to the starter switch through terminal 8 on terminal board 15 as shown in the figure, and the stationary contact 28 of the relay 25 is connected to the starter solenoid through terminal 7 on terminal strip 15. The stationary contact 29 is connected to one side of a coil 23 of a second relay 22 which comprises a movable contact 24 and a stationary contact 20. The relay 22 is normally open. Movable contact 24 is connected to one side of a vehicle horn relay 37 through terminal 6 on terminal strip 15, the other side of the horn relay 37 being connected to the ungrounded side of the vehicle battery 34. The stationary contact 20 is connected to the ground.

Most present day automobiles are constructed with a starter solenoid or relay having its contacts connected between the battery and the starter motor and having its coil energized from a momentary-contact switch, either spring-return on the ignition switch or separate on the dash board. Thus when the momentary-contact switch is closed, the coil of the starter solenoid is energized and the starter motor is connected across the vehicle battery. When the motor has started, the momentary-contact switch returns to its original position and the circuit to the starter solenoid is opened. In the single figure of the drawing, a dashed line 41 is shown where the original wiring of the automobile connected the starter solenoid 38 with the battery 34 through the switch 35 as described above. The circuitry of this invention is inserted between the switch 35 and the starter solenoid 38. In a vehicle which incorporates this invention, the starter solenoid 38 cannot be energized to start the vehicle unless the designated seat belts are properly fastened.

When starting a vehicle in which the device of this invention is installed, the driver first determines which of the seats are occupied and closes the appropriate selector switches 17, 18, 19 or 21. Assume for this description that belt switch 11 connected to selector switch 17, represents the driver's belt; belt switch 12 connected to selector switch 18 represents the belt on the front seat along side the driver, and the belt switches 13 and 14 represent the two seat belts in the rear seat. If the driver and a single passenger alongside him are in the vehicle, the selector switches 17 and 18 are closed and the selector switches 19 and 21 are open. When the driver attempts to start the vehicle, he closes the ignition switch 36 and energizes the ignition circuit. Battery potential will be available from battery 34, through the energized connection 36, and relay coil 26, and the closed selector switches 17 and 18. If the two seat belts are fastened about the driver and the passenger properly, then the switches 11 and 12 will be open. No current will flow in the circuit through the relay 25, and the movable contact 27 will remain in the position shown. When the momentary-contact starter switch is closed, current will flow from the battery 34, through the starter switch 35, the contacts 27 and 28 of the relay 25 to the starter solenoid 38 and ground, starting the vehicle motor. If, however, when ignition circuit 36 is closed and before the momentary-contact starter switch 35 is contacted, the seat belts are not properly fastened about the driver and passenger, then the belt switches 11 or 12 or both will remain closed and current will flow from the battery 34 through the connection 36, the relay coil 26, selector switches 17 and 18 and belt switches 11 and 12 to the ground. This current energizes the signal light 31 which is connected across the relay coil 26, and if the switch 33 is closed, the buzzer 32 is also energized. When the relay coil 26 is energized, the movable contact 27 is moved to engagement with contact 29. An attempt to start the vehicle by closing starter switch 35 energizes relay 22 by passing current through switch 35 contacts 27 and 29, and relay coil 23 to ground. Coil 23 of relay 22 being energized causes contact 24 to close on contact 20. This closing action grounds the horn relay 37 in the same manner as the horn ring on the steering wheel and causes the horn to blow. Thus, if any one of the designated seat belts is improperly fastened, an attempt to start the car results first in a visual warning light 31, an audible warning buzzer 32, and followed by sounding of the vehicle's horn during the interval the starter switch is operated. Current will not flow through movable contact 24 in contact with stationary contact 20 or relay 22 until an attempt is made to actually start the car beyond turning the ignition switch 36. Not only are appropriate signals lit and sounded as alarms, but the vehicle itself will not start as the ultimate safety measure.

When this situation arises, the driver who is aware of the device of this invention and knows of its presence in the vehicle will take appropriate action immediately. The spring-return starter switch 35 is then let go and returns to its open position. This stops the horn 37 from sounding; however the flasher lamp 31 and/or buzzer 32 will continue their warning signals. Then the seat belts can be properly fastened and the attempt to start the vehicle repeated. If the belts are in proper condition at this time, the flasher lamp 31, buzzer 32 and horn 37 will not give alarms and the vehicle will start with no further difficulties.

However, when someone not familiar with the device attempts to start the vehicle, the horn will sound indicating that an attempt to steal the vehicle or to otherwise tamper with it is being made. This will serve to attract attention and act as an effective burglar alarm. In fact, when a vehicle having this invention installed therein is left unattended, all of the selector switches 17, 18, 19 and 21 may be closed, so that unless all of the seat belts are fastened properly, it will be impossible to start the vehicle motor, and the horn will continue to sound so long as an attempt to start it is made. It is unlikely that a thief will have three friends along so that even if he did fasten the driver's seat belt, the alarm would still sound.

Once the vehicle is started, the disengagement of any seat belt will not affect its operation. Non-interference with the ignition circuit is a major safety consideration and since the circuit to the starter solenoid only is affected (not the ignition circuit), only the starting of the vehicle is affected by the unfastened seat belts. Should it become necessary to unfasten a seat belt while the vehicle is in motion, the selector switch to that belt may be opened if the operator does not want to be alerted by the signal light.

The above specification has described a new and improved signaling and control device to be installed in vehicles having seat belts to indicate when designated seat belts are not fastened properly and to prevent the starting of the vehicle until they are properly fastened. The device also serves, as described, for a burglar alarm to prevent unauthorized use or tampering with the vehicle. It is realized that the above description may indicate to those in the art other ways in which the principles of this invention may be used, and it is therefore intended that this invention be limited only by the scope of the appended claims.

I claim:

1. A seat belt alarm and safety device for a motor vehicle having an electrically started motor and at least one seat belt, said device comprising a first normally closed switch controlling only the starting of the vehicle motor, a second normally closed switch fastened to a seat belt to be opened thereby when said belt is properly fastened, and means connected to said second switch when it is closed to open said first switch when attempts are made to start said vehicle motor.

2. A seat belt alarm and safety device for use in a motor vehicle having an electrical means for starting its motor and at least one seat belt, a normally closed switch means connected to the motor starting means, to control the starting of said motor only and means connected to said seat belt to cause said normally closed switch to open when said seat belt is not properly fastened and attempts are made to start the motor so that said vehicle motor starting means is prevented from operating.

3. A motor vehicle seat belt alarm for use in a motor vehicle having means for electrically starting the vehicle motor and having at least one seat belt, said alarm comprising a first relay having a first relay coil, a first movable contact and first and second stationary contacts, a normally closed first switch fastened to the seat belt to be opened thereby when said belt is properly fastened, means for connecting said first switch means between said first relay coil and a source of electrical energy, signalling means connected across said first relay coil, means for connecting said first movable contact to a source of electrical energy, means for connecting said first stationary contact to said means for electrically starting said vehicle motor, said first movable contact normally engaging said first stationary contact, a selector switch for each seat belt, said selector switch being connected in series with said normally closed switch of the belt to which said selector switch corresponds to selectively determine whether the belt switch is operative at any time, a second relay having a second relay coil, a second movable contact and a third stationary contact, means for connecting said second stationary contact to said second relay coil and to said third stationary contact, said vehicle comprising a horn, and means for connecting said second movable contact to said horn, whereby when said seat belts are not properly fastened, and an attempt is made to start the vehicle said first relay operates to energize said second relay and said horn.

4. A seat belt alarm and safety device for use in a motor vehicle having a motor, means for electrically starting said motor, a horn, an electric battery, an ignition, and at least one seat belt; said device comprising a first relay having a first relay coil, a first movable contact and a first stationary contact said first relay being connected to prevent the operation of said starting means when energized; means for connecting one side of said first relay coil to one side of said iginition switch; means for connecting the other side of said iginition switch to one side of said battery; the other side of said battery being grounded; a normally closed switch fastened to said seat belt to be opened thereby when said seat belt is properly fastened about the body of the seat occupant; means for connecting said normally closed switch between said other side of said first relay coil and ground whereby when said normally closed switch is closed and said ignition switch is closed, said first relay coil is energized; and signal means connected across said first relay coil to be energized therewith.

5. The device defined in claim 4 further including means to connect said first stationary contact to one side of said means for electrically starting said motor, the other side of said electric start means being grounded; a start switch having one side connected to said battery; and means for connecting said first movable contact to said other side of start said switch; whereby when said first movable contact engages said first stationary contact and said start switch is closed, said electric start means is energized, the energization of said first relay coil disengaging said first movable contact and said first stationary contact, and preventing starting of said vehicle.

6. The device defined in claim 5 further including a selector switch, and means for connecting said selector switch in series between said normally closed switch and said other side of said first relay coil to determine the effect that said normally closed switch has upon the energization of the relay and the positions of said stationary contact.

7. The device defined in claim 6 further including a second relay having a second relay coil and a second movable contact, a second stationary contact in said first relay, a third stationary contact in said second relay, means for connecting one side of said second relay coil to said second stationary contact, means for connecting the other side of said second relay coil and third stationary contact to ground, and means for connecting said second movable contact to one side of said horn blowing circuit.

8. A seat belt vehicle starting control device for a vehicle which includes a vehicle battery, at least one seat belt and an electrical starting means for the vehicle motor; said device comprising a normally closed electrical switch mechanically connected to said seat belt to be opened when said seat belt is fastened; an electrical relay; and means for connecting said switch, said battery, said relay and said starting means so that said relay prevents the starting means from starting when said switch is closed and permitting completion of the starting means circuit when the switch is open.

9. A seat belt alarm circuit for motor vehicle which include at least an electrical motor starting means, a vehicle battery for energizing said starting means, a starting switch for connecting said starting means to said battery, and at least one seat belt; said circuit comprising a normally closed electrical switch mechanically connected to said seat belt to be opened when the seat belt is properly fastened; a relay having at least a pair of contacts and a coil for operating said contacts; means for connecting said relay contacts in series with said starting switch, said starting means and said battery; and means for connecting said normally closed switch in series with said battery and said coil so that said contacts are closed when said switch is open and said contacts are open when said switch is closed to prevent operation of the motor starting means when said seat belt is not properly fastened.

References Cited
UNITED STATES PATENTS 3,226,674 12/1965 Eriksson _____ 340—53
3,237,710 3/1966 MacDonald _____ 180—82

THOMAS B. HABECKER, *Acting Primary Examiner.*

NEIL C. READ, *Examiner.*

A. H. WARING, *Assistant Examiner.*